Jan. 29, 1963

H. K. NAJARIAN 3,075,751

GAS SCRUBBER

Filed Aug. 2, 1960

INVENTOR
HERAND K. NAJARIAN

BY Stowell & Stowell

ATTORNEYS

Jan. 29, 1963 H. K. NAJARIAN 3,075,751
GAS SCRUBBER
Filed Aug. 2, 1960 4 Sheets-Sheet 2

INVENTOR
HERAND K. NAJARIAN

BY Stowell & Stowell

ATTORNEYS

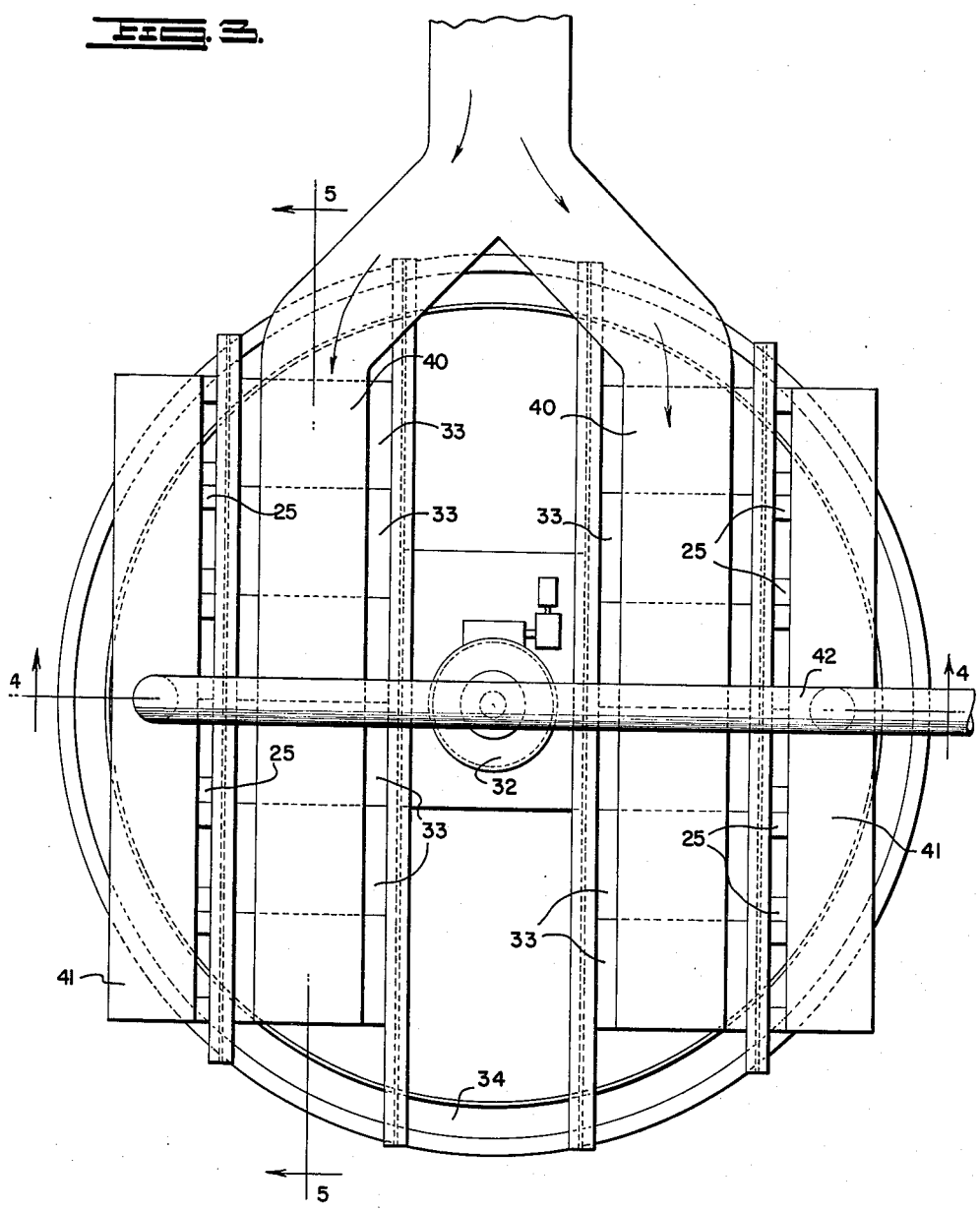

Jan. 29, 1963 H. K. NAJARIAN 3,075,751
GAS SCRUBBER
Filed Aug. 2, 1960 4 Sheets-Sheet 4
FIG. 4.
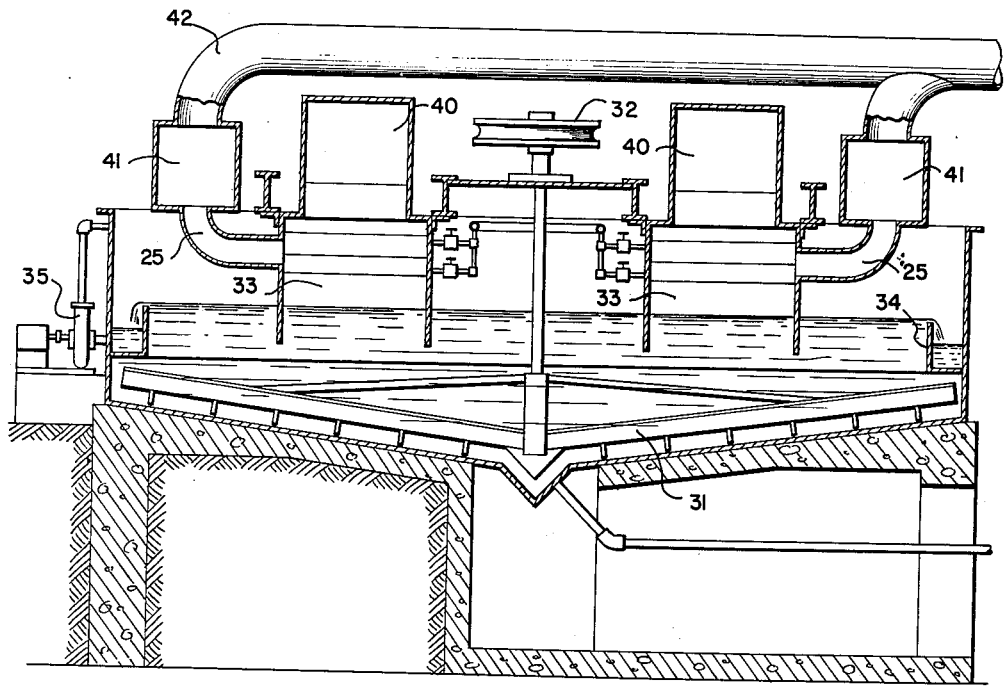
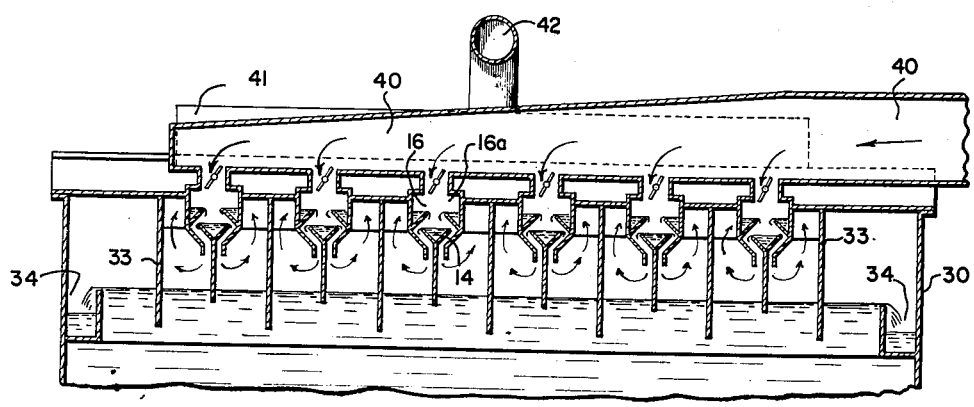
FIG. 5.
INVENTOR
HERAND K. NAJARIAN
BY Stowell & Stowell
ATTORNEYS

3,075,751
GAS SCRUBBER
Herand K. Najarian, 1400 River Road, Beaver, Pa.
Filed Aug. 2, 1960, Ser. No. 46,989
4 Claims. (Cl. 261—112)

This invention pertains to a novel apparatus for separating contaminants from air or other gas, wherein the gas carrying contaminants is scrubbed with a liquid scrubbing medium in the apparatus. Subsequently, a mixture of the captured contaminants and liquid scrubbing medium is withdrawn from the apparatus and relatively clean gas is discharged from the apparatus. The invention is applicable to removal of various contaminants from air or other gases, such as, rock and mineral dusts, fly ash, acid, oil mists, dusts from mechanical grinders, lint, and the like, and comprises improvements in gas cleaning apparatus designated in the arts variously as air-washers, scrubbers, gas cleaners, and wet dust collectors.

In the apparatus of the invention, contaminants entrained in a gas are separated from the gas by impinging the gas onto mobile surfaces of a liquid scrubbing medium contained in the apparatus, whereby the contaminants separate from the gas by centrifugal force and are incorporated in the liquid scrubbing medium. Thereafter, a mixture of captured contaminants and liquid scrubbing medium is withdrawn from the apparatus and the relatively clean gas is discharged from the apparatus.

Among typical examples of many useful applications of the improved apparatus of the invention, may be mentioned:

Cleaning and humidifying the air circulating in domestic and industrial heating and air conditioning installations, wheren, in addition to capturing the suspended dust particles from the air in the scrubbing water, the humidity of the air may be controlled by varying the temperature of the scrubbing water.

Separating from air or other gases suspended coal dust, rock dust, mineral dust, fly ash, dust from grinding operations, and the like, wherein a slurry of dusts and water is withdrawn from the apparatus.

Separating minute liquid particles suspended in air or other gases, such as acid mists, oil mists, paint spray, and the like, and removing said mists as a suspension or solution in the liquid scrubbing medium.

Several types of "wet scrubbers" are well known and are widely used throughout industry. One such type is a spray-tower scrubber wherein dirty gas is passed upwardly through an upright tower, while counter-currently, a spray of scrubber liquid is passed downwardly. These spray towers operate inefficiently in a hit-or-miss fashion since only part of the gas comes in contact with small droplets of the scrubbing medium. Centrifuging effect to project the heavier dust or mist out of the stream of air or gas is non-existent, cleaning of gas is partial, and some of the fine spray of the scrubbing liquor is carried along in the exhaust gas.

Another type of wet scrubber disclosed in the prior art is known as air-washers or dust-arresters, wherein dirty gas is passed in a generally horizontal direction through falling showers of scrubbing liquor. The gas stream tends to break up the shower and carry in suspension finer droplets of liquid which have to be later separated from the gas stream. Furthermore, full beneficial effect of centrifuging due to initial impingement of gas stream onto the falling stream of scrubbing liquor is lost due to entrainment of the liquor in the form of droplets in the stream of gas.

One objective of the present invention, in general, is to provide gas cleaning apparatus that is simple in design, inexpensive, practically automatic in operation and adapted to remove many types of contaminants from air or industrial gases and to promote practical and inexpensive abatement of atmospheric pollution.

In an apparatus designed to clean gases carrying heavier contaminants, such as, dusts, mists, and the like through intimate contact with a liquid scrubbing medium, there are a number of prerequisites that have to be met to insure relatively complete separation of contaminants, capture of contaminant in the liquid scrubbing medium, and ability of the apparatus to continue to operate without impairment of efficiency over long periods of operation.

The most effective means of separating suspended contaminants from a fluid mass is to subject the fluid to centrifugal action. This applies to gases as well as to liquids. The most effective way of centrifuging gases is to impinge a stream of the gas against surfaces normal or at a steep angle to the direction of the flow of the gas and, thus, provide an abrupt turn in the direction of gas flow. Heavier particles tend to remain in the direction of flow and, thus, are thrown out of the gas stream against said surface. When the surface on which the gas is caused to impinge is a liquid surface, then these heavier particles of contaminants are forced into the body of the liquid scrubbing medium.

Secondly, the surfaces on which the gas impinges in its passage through the scrubbing apparatus should be unbroken liquid surfaces and should remain substantially unbroken in the zone of impingement. When a stream of gas flowing substantially horizontally impinges on a thin sheet of liquid scrubbing medium, falling free in the gas stream, the velocity of the stream of gas will tend to break up the thin sheet of liquid scrubbing medium into a shower of liquid droplets. There will be little, if any, change in the direction of the gas stream and, consequently, no centrifuging of the heavier contaminants suspended in the gas stream and insignificant separation of the contaminants from the gas stream. However, if the sheet of liquid scrubbing medium is made to flow over the surface of a near vertical or steep solid wall, such as a sheet of steel plate and the gas stream impinged against the sheet of flowing liquid scrubbing medium, then the impingement will cause the stream of gas to change direction abruptly causing the contaminants to be thrown against the flowing stream of liquid scrubbing medium and carried away by the liquid scrubbing medium. In the scrubbing apparatus of the invention, the gas stream carrying the suspended contaminants is caused to impinge vertically or at a steep angle initially on surface of a pool of the liquid scrubbing medium, and, subsequently to impinge on inclined surfaces washed by unbroken sheets of liquid scrubbing medium flowing continuously, so that the gas stream throughout its passage through the scrubbing apparatus is subjected to repeated impingements against such sheets of liquid scrubbing medium which provide ideal impingement surfaces and which automatically wash the contaminants away from the impingement surfaces and prevent build-up of accretions.

One important feature of the invention which contributes materially to effectiveness of elimination of pollutants from air or gas is that in the apparatus of the invention the entire stream of dirty gas to be cleaned impinges initially onto the surface of a body of liquid scrubbing medium held in upper part of said apparatus, subsequently passes downwardly through a constricted tortuous path extending from the level of said first body of liquid scrubbing medium to the level of a second body of liquid scrubbing medium held in lower part of said apparatus below said first body of liquid scrubbing medium, said tortuous path having walls continuously washed by sheets of liquid scrubbing medium, and finally impinges on the surface of said second lower body of liquid scrubbing medium, and thereafter the gas, now relatively free of contaminants due to repeated impingements onto mobile surfaces of liquid scrubbing medium, is discharged from said apparatus.

A further important feature of the invention is that the stream of dirty gas passing through the apparatus comes in contact only with internal surfaces of the apparatus that are continually being washed with substantially unbroken sheets of liquid scrubbing medium until clear air or gas passes through the entire impingement and cleaning zone within the apparatus. Thus accumulations of solid contaminants on damp, inactive, and unwashed surfaces within the apparatus through contact with dirty incoming gas are avoided and the necessity for periodic cleaning of the apparatus is minimized.

One of the problems in connection with operation of all types of air and gas cleaning apparatus is the disposal of the captured contaminants. The apparatus of the invention provides the simplest of means for disposal of such contaminants. Provision is made for accumulation of the contaminants within the apparatus as a suspension or solution of the contaminants in the liquid scrubbing medium. Periodically or, if desirable, continuously, the suspension or solution of contaminants is pumped out of the apparatus. If the contaminant has economic value, then the mixture of contaminant and scrubber liquor is processed by any one of well known recovery methods for recovery of the contaminant in a form suitable for further processing or sale.

The invention will be more particularly described with reference to the accompanying drawings in which:

FIG. 2 is a sectional elevation on line 2—2 of FIG. 1;

Figure 1:
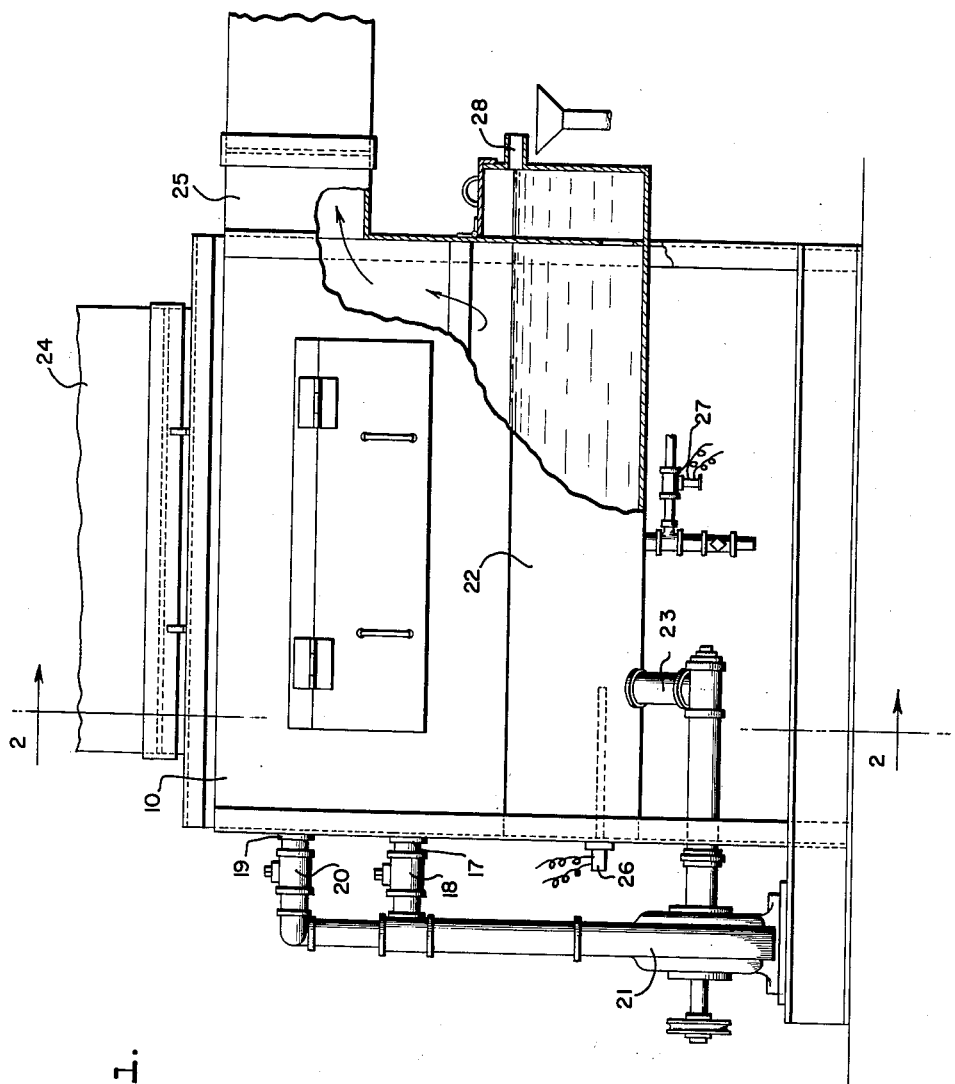
FIG. 1 is an elevation in partial section of one form of the scrubber of the invention, which is particularly adapted for use with domestic and industrial circulating-air-type space heaters.
Figure 8:
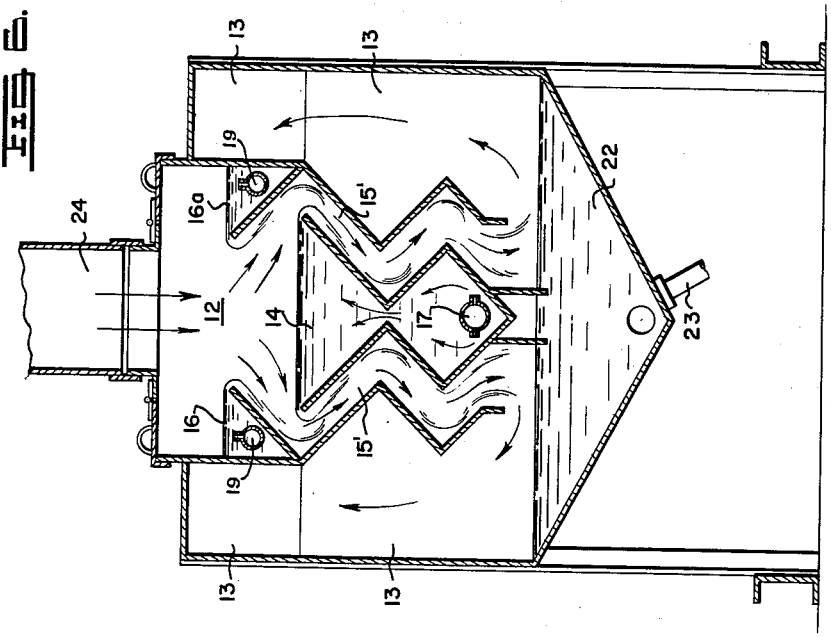
Figure 9:
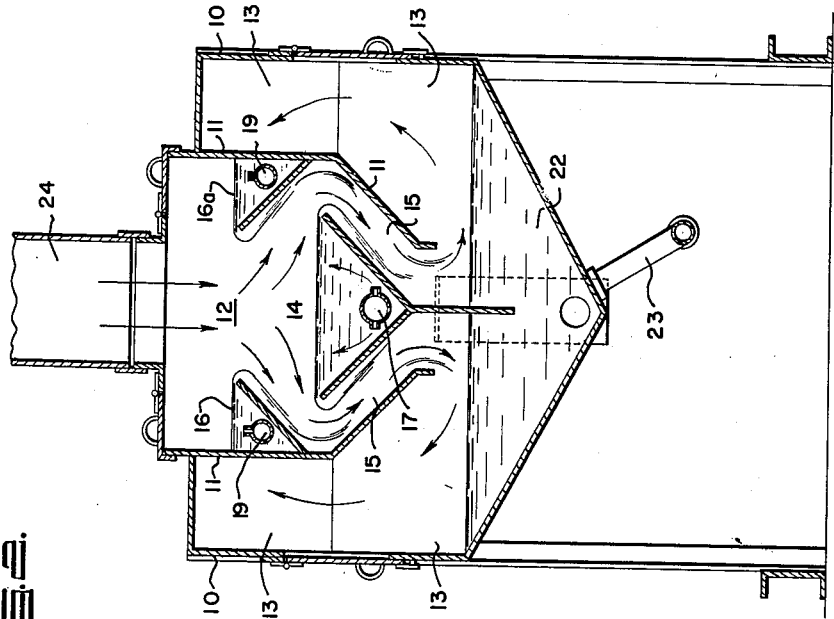

FIG. 3 is a plan view of a modification of the apparatus of the invention particularly suitable for cleaning large volumes of air or gas, wherein plurality of scrubbing units of the type shown in FIGS. 1 and 2, with slight modifications, are assembled to form a unit having a bottom sump holding a body of liquid scrubbing medium common to the assembly and, preferably, a rake mechanism whereby slurry may be moved to a central point in the sump and discharged therefrom;

FIG. 4 is a sectional elevation on line 4—4 of FIG. 3;

FIG. 5 is a section on line 5—5 of FIG. 3 showing a plurality of scrubber units assembled in a line and wherein the bottom sump is common to all scrubber units, and FIG. 6 is a cross-section of a modified form of scrubber unit wherein the tortuous scrubbing channels provide additional turns and impingement surfaces for the passing gas.

Apparatus of the invention in one of its simplest forms and adapted particularly for relatively low pressure domestic and industrial space-heating installations comprises, as shown in FIGS. 1 and 2, a vertically disposed casing 10, having a bottom sump portion 22, adapted to hold a body of liquid scrubbing medium, partition members 11, dividing the apparatus into a dirty gas inlet chamber 12 and a clean gas outlet chamber 13, a centrally located receptacle 14, opening upwardly into the gas inlet chamber 12 and adapted to hold a body of liquid scrubbing medium above the body of liquid scrubbing medium in bottom sump 22, tortuous channels 15 extending downwardly from the inlet chamber 12 to outlet chamber 13, and having a lower opening into the outlet chamber above the liquid scrubbing medium held in the bottom sump portion 22, and troughs 16 and 16a within the inlet chamber 12 and disposed above the upper openings of channels 15, for the flow of liquid scrubbing medium from the troughs into the channels 15 by gravity.

Liquid scrubbing medium is supplied to the central receptacle 14 through pipe 17, the amount being regulated by valve 18, and to troughs 16 and 16a through pipes 19, regulated by valves 20. Liquid scrubbing medium overflowing the receptacle 14 and troughs 16 and 16a flows downwardly along the wall surfaces of the tortuous channels 15, partly due to capillarity of the liquid scrubbing medium and partly due to diversion thereof by impact of gas passing therethrough at high velocity, thus washing the inside surfaces of the channels continuously.

During operation liquid scrubbing medium from bottom sump 22 is elevated continuously to the receptacle 14 and troughs 16 and 16a within the gas inlet chamber, for example, by pump 21.

Dirty gas enters the apparatus through gas inlet duct 24, impinges initially on the surface of liquid scrubbing medium in receptacle 14, passes downwardly through tortuous channels 15, and as it emerges from the bottom of the channels impinges on the surface of the liquid scrubbing medium in the bottom sump 22, the level of which is maintained constant, thus making an abrupt turn as it is discharged in the gas outlet chamber 13. The gas may be propelled through the apparatus equally well by suction applied to gas outlet chamber by a suction fan connected to outlet duct 25, or by a pressure blower connected to the gas inlet duct 24.

The width and cross-sectional area of scrubber channels 15, are adjusted to obtain a gas velocity within the channels to cause effective centrifuging and impingement of gas onto the surfaces of the channels at points of turn in direction of gas flow and the number of such turns and total length of channels are designed to obtain a high degree of elimination of contaminants. The scrubbing unit of FIG. 6 is shown with channels 15' having more turns in the downward path of gas flow than the channels shown in FIG. 2.

When it is desired to control the amount of humidity in the air, as for instance in heating and air-conditioning installations, the temperature of the circulating water may be raised to increase the vapor pressure and thus obtain higher humidity as desired. The water may be heated by inserting into the lower sump an electric immersion heater as indicated at 26 in FIG. 1.

In order to control and limit the amount of suspended or dissolved contaminants in the circulating liquid scrubbing medium, a solenoid controlled water supply valve 27 is provided which operates in conjunction with the air moving fan or an independent clock mechanism to admit controlled amounts of fresh liquid scrubbing medium into the apparatus and corresponding amount of liquid scrubbing medium containing contaminants overflow from the constant level overflow outlet 28, attached to and communicating with the bottom sump 22.

When the apparatus is intended to handle large volumes of gas, several scrubber units similar to one shown in FIGS. 1 and 2 may be assembled so as to provide partition walls common to adjacent scrubber units and also provide one single bottom sump common to all assembled scrubber units, thus realizing economies in construction. Furthermore, such an assembly makes it possible to install a revolving rake mechanism at the bottom of the sump tank to collect the settled contaminants to a central point in the sump to permit continuous discharge of contaminants as a slurry. This construction also promotes free settling of heavier solid contaminants so that peripheral overflow will be relatively free of the contaminants.

Referring to FIGS. 3–5, 30 is a tank, preferably circular, having a sloping bottom and a conventional rake mechanism 31, rotated by gear 32. Rows of scrubber units 33, each row assembled so as to have portions of casing wall common to adjacent units, are shown in FIG. 5 as section 5—5 of FIG. 3. The rows of scrubber units are suspended in tank 30 so that bottom edges of the outside casing walls of scrubber units dip some distance below the surface of the liquid scrubbing medium in tank 30. The level of the liquid scrubbing medium is held constant by means of peripheral overflow launder 34.

Liquid scrubbing medium from launder 34 flows into pump 35 and thence elevated to central receptacles 14 and troughs 16 and 16a in the several scrubber units. In such an assembly dirty gas to be cleaned enters the apparatus through inlet manifolds 40 and is distributed to the several scrubber units as shown in FIG. 5. Similarly, cleaned gas from the several units passes into clean gas outlet manifolds 41 and thence into outlet duct 42.

I claim:

1. A gas scrubber comprising a casing having a gas inlet and gas outlet in the upper portion, and providing a sump at the bottom portion adapted to hold a body of liquid wash medium, partition means dividing the upper portion of the casing into an inlet chamber including the gas inlet and an outlet chamber including the gas outlet, a receptacle within the inlet chamber open at the top to said inlet chamber and adapted to hold a body of liquid wash medium above the level of wash medium in said bottom sump, channels providing tortuous passageways between said partition means and said receptacle extending downwardly from the inlet chamber to the outlet chamber, means for supplying liquid wash medium to said receptacle and to the upper openings of said channels, and means for removing liquid wash medium from the bottom sump to maintain the level thereof constant.

2. A gas scrubber comprising a tank having bottom and side walls and adapted to hold a body of wash medium and peripheral overflow launder means to maintain the level of said wash medium constant, a plurality of gas scrubbing units depending from the top of said tank, each unit comprising a casing having a gas inlet and a gas outlet in the upper portion, and opening at bottom into the lower body of wash medium in said tank below the level thereof, partition means depending from top of the casing of each scrubber unit and dividing the upper portion of the casing into a gas inlet chamber including the gas inlet and a gas outlet chamber including the gas outlet, a receptacle within inlet chamber of each scrubber unit open at the top to said inlet chamber and adapted to hold a body of liquid wash medium above the level of wash medium in said tank, channels within each scrubber unit providing tortuous passageways between said partitions and said receptacles and extending downwardly from the inlet chambers to the outlet chambers, and means for transporting liquid wash medium overflowing from said bottom tank to said receptacles and to the upper openings of said channels.

3. A gas scrubber comprising a tank having bottom and side walls and adapted to hold a body of wash medium and peripheral overflow launder means to maintain the level of said wash medium constant, a plurality of gas scrubbing units depending from the top of said tank, each unit comprising a casing having a gas inlet and a gas outlet in the upper portion, and opening at bottom into the lower body of wash medium in said tank below the level thereof, partition means depending from top of the casing of each scrubber unit and dividing the upper portion of the casing into a gas inlet chamber including the gas inlet and a gas outlet chamber including the gas outlet, a receptacle within inlet chamber of each scrubber unit open at the top to said inlet chamber and adapted to hold a body of liquid wash medium above the level of wash medium in said tank, channels within each scrubber unit providing tortuous passageways between said partitions and said receptacles and extending downwardly from the inlet chambers to the outlet chambers, means for transporting liquid wash medium overflowing from said bottom tank to said receptacles and to the upper openings of said channels, manifold conduit means communicating with the gas inlet chambers of said scrubber units, and manifold conduit means communicating with the gas outlet chambers of said scrubber units.

4. A gas scrubber comprising a tank having bottom and side walls and adapted to hold a body of wash medium and peripheral overflow launder means to maintain the level of said wash medium constant, a plurality of gas scrubbing units depending from the top of said tank, each unit comprising a casing having a gas inlet and a gas outlet in the upper portion, and opening at bottom into the lower body of wash medium in said tank below the level thereof, partition means depending from top of the casing of each scrubber unit and dividing the upper portion of the casing into a gas inlet chamber including the gas inlet and a gas outlet chamber including the gas outlet, a receptacle within inlet chamber of each scrubber unit open at the top to said inlet chamber and adapted to hold a body of liquid wash medium above the level of wash medium in said tank, channels within each scrubber unit providing tortuous passageways between said partitions and said receptacles and extending downwardly from the inlet chambers to the outlet chambers, means for transporting liquid wash medium over-flowing from said bottom tank to said receptacles and to the upper openings of said channels, means for transporting solid contaminants settling to the bottom of said tank to a discharge outlet therefrom.

References Cited in the file of this patent

UNITED STATES PATENTS

| | | |
|---|---|---|
| 453,072 | Anderson et al. | May 26, 1891 |
| 2,899,183 | Umbricht et al. | Aug. 11, 1959 |